Figure 3:
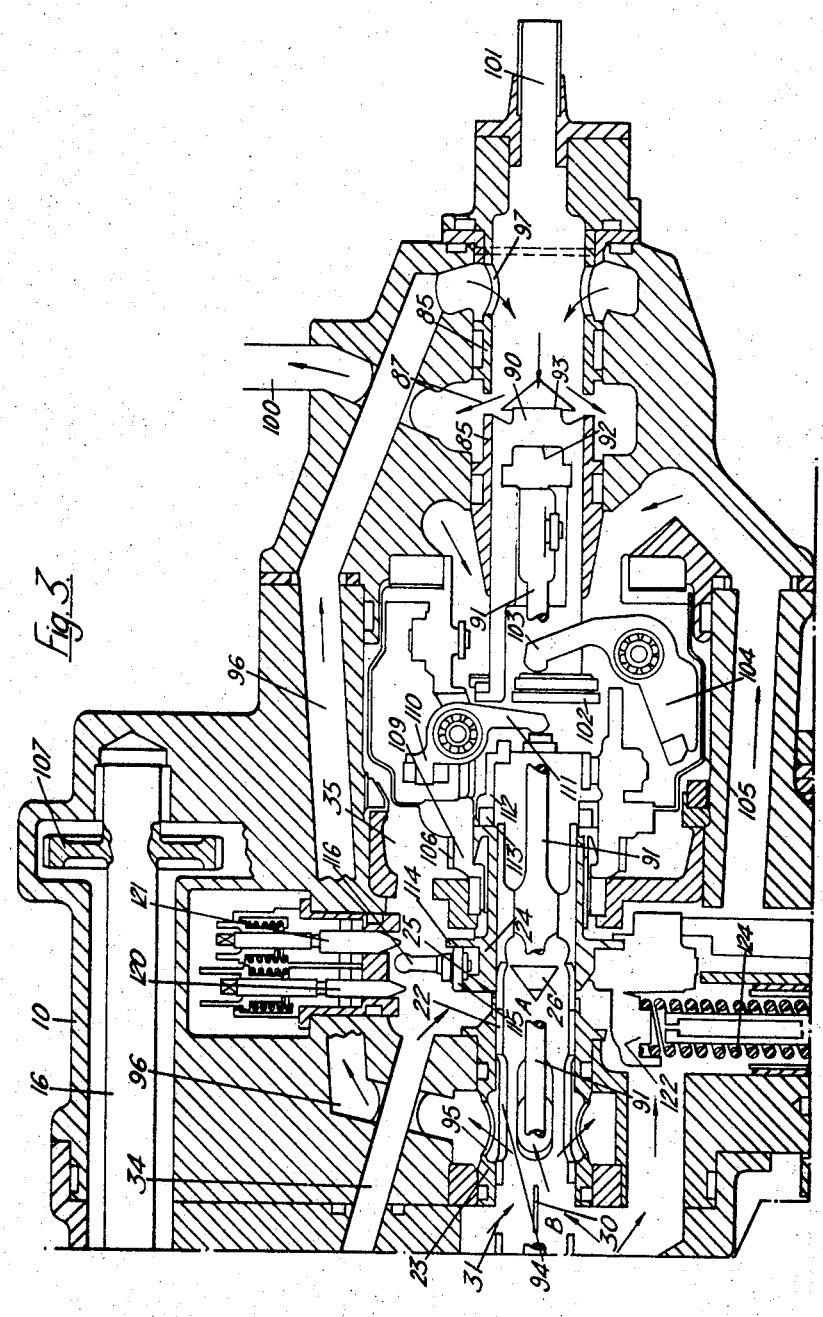

Oct. 31, 1967  C. L. JOHNSON  3,349,557
GAS TURBINE ENGINE FUEL SYSTEM
Filed May 31, 1966  4 Sheets-Sheet 1
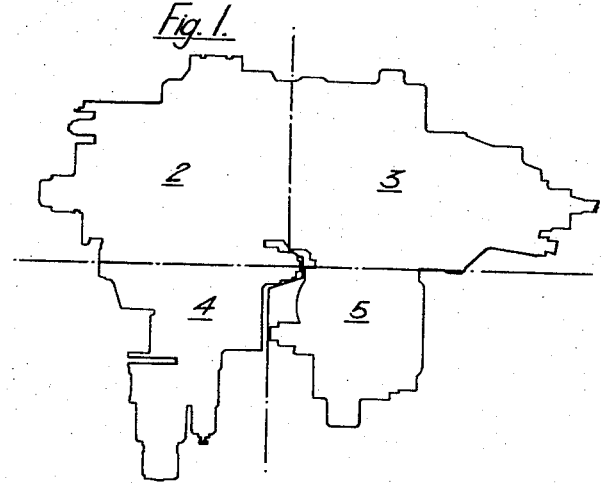
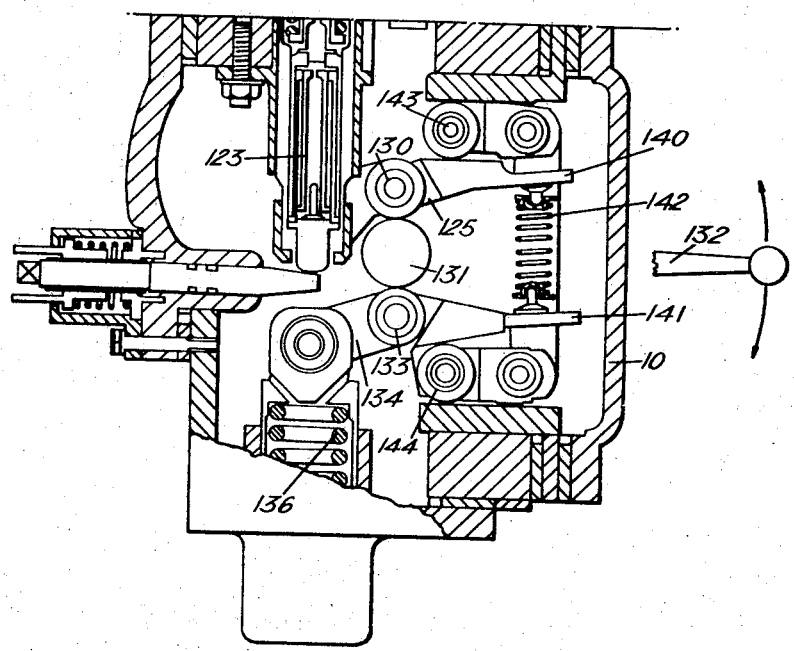

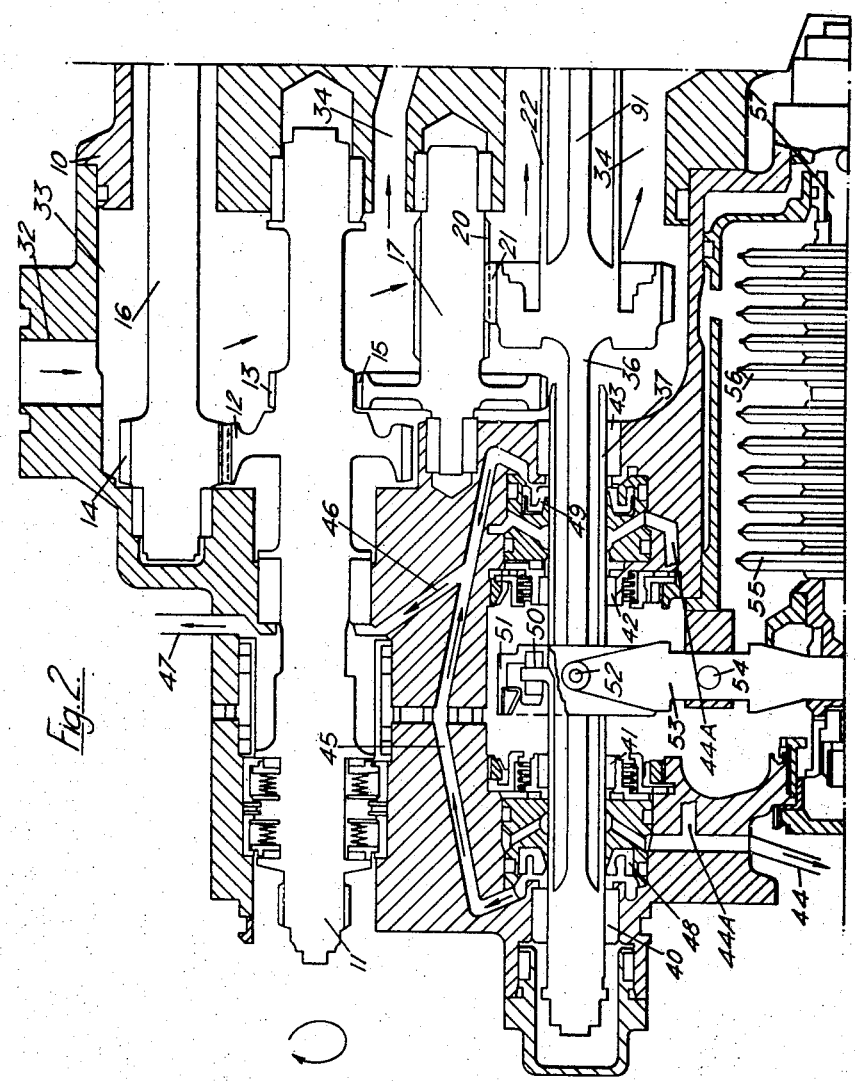

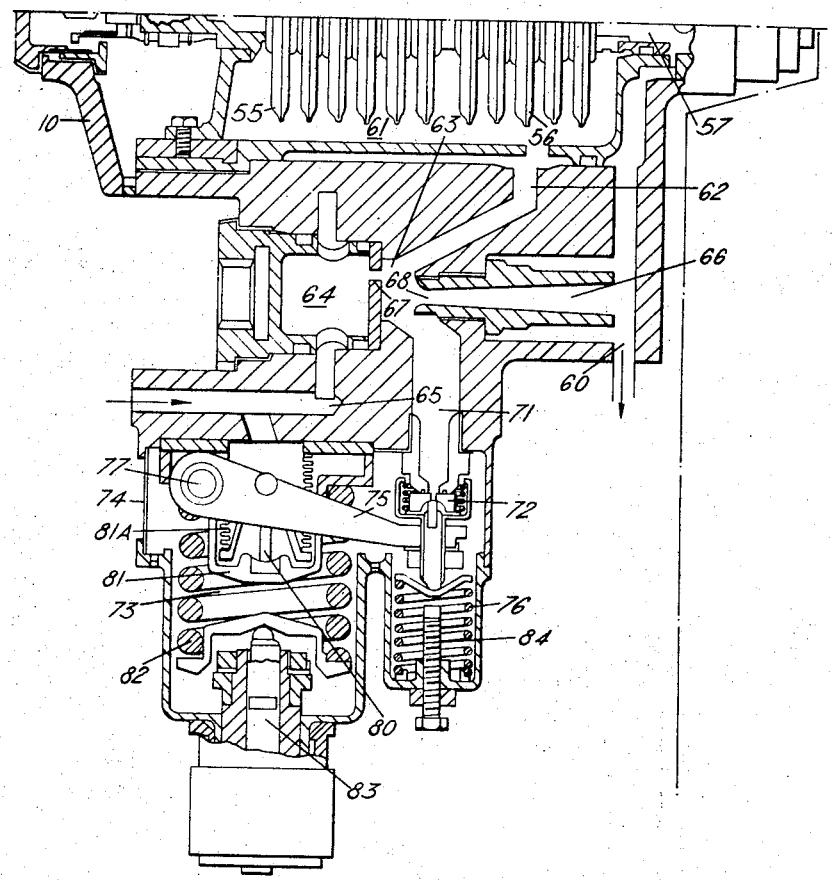

United States Patent Office 3,349,557
Patented Oct. 31, 1967

3,349,557
GAS TURBINE ENGINE FUEL SYSTEM
Christopher Linley Johnson, Derbyshire, England, assignor to Rolls-Royce Limited, Derby, England, a British company
Filed May 31, 1966, Ser. No. 553,834
Claims priority, application Great Britain, June 23, 1965, 26,667/65
17 Claims. (Cl. 60—39.28)

This invention concerns a gas turbine engine fuel system.

According to the present invention, there is provided a gas turbine engine fuel system comprising a metering orifice, means for varying the size of the metering orifice in accordance with at least one engine variable, means for passing through the metering orifice a portion only of the full flow of fuel which flows through the fuel system, a throttle valve which is arranged downstream of the metering orifice and which controls the flow of fuel to a burner or burners of the engine in accordance with the pressure drop across the metering orifice, and means for passing through the throttle valve at least a part of both the said portion of the full flow of fuel and the remaining portion thereof.

The said portion which passes through the metering orifice is preferably a major portion of the said full flow of fuel.

An acceleration control governor is preferably provided for positioning the throttle valve axially in dependence upon engine rotational speed, the acceleration control governor progressively opening the throttle valve with increased engine rotational speed.

A second metering orifice is preferably provided whose size varies in accordance with at least one engine variable, the said remaining portion passing through the second metering orifice prior to passing through the throttle valve. Thus, the said second metering orifice may always be at least partially open, whatever the value of the respective engine variable or variables.

The first mentioned metering orifice and the said second metering orifice preferably comprise axially spaced apart apertures in a common sleeve.

The common sleeve may be mounted within a fixed bush and may be axially movable therein by pressure responsive means which are responsive to a function of a pressure or pressure ratio prevailing in compressor means of the engine, the said fixed bush obturating each of the said axially spaced apart apertures in the common sleeve to an extent depending upon the axial position of the common sleeve.

At least some of the apertures in the common sleeve preferably have an axially varying cross section. If desired, only those apertures in the common sleeve which are part of the first-mentioned metering orifice have an axially varying cross section.

Means are preferably provided for rotating the common sleeve, the common sleeve being connected to the throttle valve by means which are adapted to impart rotation to the latter without imparting axial movement thereto.

The common sleeve may be mounted within an axially movable sleeve which is spaced from said fixed bush by an annular gap whose width depends upon the axial disposition of the said axially movable sleeve, the axially movable sleeve being positioned axially by an all speed governor which is responsive to engine rotational speed and which is adapted to limit the latter to a selected value.

The axially movable sleeve may be movable in one direction by the all speed governor, the axially movable sleeve being urged towards the opposite direction by resilient means whose force is adjustable both by a manual control and by a temperature compensating device which is responsive to fuel temperature.

The acceleration control governor and the all speed governor are preferably constituted by centrifugal governors which are carried by a common rotatable housing which is adapted to be driven by the engine. Means may, if desired, be provided for rotating the said common housing at a greater rotational speed than the said common sleeve.

The pressure responsive means may comprise conduit means opposite ends of which are respectively open to two different pressures prevailing in the compressor means of the engine, the conduit means having two spaced restrictions the space between which communicates with a chamber within which is mounted a bellows, the bellows being arranged to effect axial positioning of the common sleeve.

Pressure relief means are preferably provided for preventing the pressure at one of the said opposite ends of the conduit means from exceeding a predetermined value.

At least a portion of the bellows is preferably open to the pressure prevailing at one of the said opposite ends of the conduit means.

The invention is illustrated, merely by way of example, in the accompanying drawings in which:

FIGURE 1 is an outline view of a gas turbine engine fuel system according to the present invention, and FIGURES 2–5 show different parts of the structure of FIGURE 1 on an enlarged scale.

Terms such as "left" and "right," as used in the description below, are to be understood to refer to directions as seen in the drawings.

Referring to the drawings, a gas turbine engine fuel system comprises a fuel control unit having a body 10. Rotatably mounted within the body 10 is a drive input shaft 11 which is driven (by means not shown) from the engine at a speed which is a fixed proportion of engine speed.

The drive input shaft 11 is provided with gears 12, 13 which mesh respectively with gears 14, 15 on lay shafts 16, 17 respectively.

The lay shaft 17 has a gear 20 which meshes with a gear 21 carried by a rotatably mounted, axially movable sleeve 22. The sleeve 22 is thus rotated throughout the operation of the said engine. The gear 20 is of substantially greater axial length than the gear 21 so that the latter will remain in mesh with the former throughout axial movement of the sleeve 22.

The sleeve 22 is mounted within a fixed bush 23 and within an axially movable sleeve 24, the sleeve 24 being spaced from the fixed bush 23 by an annular gap 25 whose width depends upon the axial position of the sleeve 24.

The sleeve 22 is provided, adjacent the annular gap 25, with a plurality of angularly spaced apart apertures 26 of triangular or other axially varying cross section.

The annular gap 25 and the apertures 26 together co-operate to provide a metering orifice whose size thus depends upon the axial disposition of the sleeves 22, 24.

The sleeve 22 is also provided with a plurality of angularly spaced apart apertures 30 each of which has a constant cross section axially, the apertures 26, 30 being axially spaced apart. As will be seen from FIGURE 3, the fixed bush 23, which obturates each of the apertures 26 to an extent depending upon the axial position of the sleeve 22, also obturates each of the apertures 30 to an extent depending upon the said axial position of the sleeve 22. A gap 31 is thus provided between the left hand end of each of the apertures 30 and the left hand end of the fixed bush 23.

The gap 31 and the apertures 30 together co-operate to provide a metering orifice whose size depends upon the axial disposition of the sleeve 22.

The body 10 is provided with a fuel inlet 32, (FIGURE 2), which communicates with a chamber 33 in which the drive input shaft 11, the lay shafts 16, 17 and the left hand end of the sleeve 22 are located. A minor portion of the fuel supplied to the chamber 33 passes through the metering orifice 30, 31 so as to enter the interior of the sleeve 22. The major portion of the fuel supplied to the chamber 33 passes, however, via a number of conduits 34 to a chamber 35 which communicates with the interior of the sleeve 22 by way of the metering orifice 25, 26.

The sleeve 22 is connected by a quill shaft 36 to a sleeve 37 which is rotatably mounted and axially movable in bearings 40, 43 in the body 10. Fuel which has leaked past the said bearings may pass to a low pressure region of the fuel system (not shown) via conduits 45, 46, 47. The sleeve 37 passes through seals 41, 42 and 48, 49 which prevent appreciable leakage of air and low pressure fuel respectively. Any leakage of fuel or air past these seals passes to drain via drain conduits 44, 44A.

The sleeve 37 is rotatably mounted in a thrust bearing 50 which is mounted within a yoke 51 having a pivot 52 on which are mounted the limbs of a forked lever 53. The lever 53, which is pivoted at 54, is also pivotally connected to a bellows having an evacuated compartment 55 and a compartment 56 whose interior communicates with a chamber 57. The chamber 57 communicates with a conduit 60 which is open (by means not shown) to a supply of air at the pressure ($P_2$) prevailing at the downstream end of the low pressure compressor of the engine or to a supply of air at a pressure functionally related thereto.

The bellows 55, 56 are mounted within a chamber 61 which communicates via a passage 62 with a space 63. The space 63 is disposed between a chamber 64, which forms part of a conduit 65, and a conduit 66, the space communicating with the conduits 65, 66 via restrictions 67, 68 respectively. The right hand end of the conduit 66 communicates with the conduit 60 so as to receive air at the pressure $P_2$, while the conduit 65 is open to a supply of air at a pressure ($P_3$) which is that prevailing at the downstream end of the high pressure compressor of the engine or is functionally related thereto. The pressure in the space 63 may be designated $P_{3p}$ and this pressure is applied to the exterior of the bellows 55, 56.

Thus, the bellows 55, 56 effect axial positioning of the sleeve 22, and the rotation of the sleeve 22 during this axial positioning helps to prevent the sleeve 22 from tending to stick in a certain position.

The space 63 communicates with a passage 71 which itself communicates by way of a valve 72 with a chamber 73 having an outlet port 74. Thus, when the valve 72 is open, the pressure $P_{3p}$ in the passage 71 and in the space 63 will drop.

The valve 72, which is mounted at one end of a lever 75, is urged towards the closed position by a spring 76.

The lever 75 is pivotally mounted at 77 and is connected by an arm 80 to a spring carrier 81, the spring carrier 81 surrounds a bellows 81A which is subject to the difference in pressure between the pressure $P_3$ in the conduit 65 and atmospheric pressure in the chamber 73. The spring carrier 81 is urged towards the closed position of the valve 72 by a spring 82 whose compression can be adjusted by an adjustment screw 83.

Thus, when the pressure $P_3$ has reached a predetermined value, the valve 72 will open and reduce the pressure in the passage 71.

This arrangement limits the extent to which the bellows 55, 56 can move the sleeve 22 axially towards the left to increase the effective size of the apertures 26, 30.

As will be appreciated, the engine pressures to which the bellows 55, 56 respond effect variation in the size of both the metering orifices 25, 26 and 30, 31. The arrangement is such that the metering orifice 30, 31 is always at least partly open whatever may be the value of the said pressures. The apertures 30 are therefore made of a size such that the flow through them never exceeds the deceleration requirements of the engine.

Mounted within the right hand end of the body 10 is a fixed bush 85 in which there are a plurality of holes 87. Mounted within the bush 85 is an axially movable and rotatable throttle valve 90.

Concentrically mounted within and secured to the sleeve 22 is a quill shaft 91 which is connected by splines or other means to the throttle valve 90 so as to be adapted to impart rotation thereto without imparting axial movement thereto.

The throttle valve 90 has oppositely disposed pressure surfaces 92, 93 of which the pressure surface 92 is open to the pressure within the chamber 35 and is therefore open to the pressure on the upstream side of the metering orifices 25, 26 and 30, 31.

The sleeve 22 is provided with a plurality of angularly spaced apart apertures 94 which are disposed between the apertures 26, 31 and which communicate via apertures 95 in the fixed bush 23 with a number of conduits 96. Each of the conduits 96 communicates with the interior of the bush 85 by way of apertures 97 therein.

Thus, the pressure surface 93 is open to the pressure on the downstream side of the metering orifices 25, 26 and 30, 31.

Both the portion of the fuel which has passed through the metering orifice 25, 26 and the portion thereof which has passed through the metering orifice 30, 31 flow through the conduits 96 and thence to the throttle valve 90. The throttle valve 90, by adjusting the exposed area to the holes 87, controls the flow through a conduit 100 to main burners (not shown) of the engine. The space within the bush 85 is, however, open directly to a conduit 101 which leads to pilot burners (not shown) of the engine, whereby the flow to these pilot burners will not be affected by the axial position of the throttle valve 90.

The throttle valve 90 has a flange 102 which is engaged by arms 103 of a plurality of centrifugal governors forming part of an acceleration control governor 104. The governor 104 is carried by a rotatable housing 105. The housing 105 is provided with a gear 106 which meshes with a further gear (not shown) which itself meshes with and is driven by a gear 107 on the lay shaft 16. The gearing is such that the housing 105 is rotated by the engine at a substantially greater rotational speed than the sleeve 22.

As will be appreciated, the acceleration control governor 104 thus positions the throttle valve 90 axially in dependence upon engine rotational speed, the acceleration control governor 104 progressively opening the throttle valve 90 with increased engine rotational speed. The pressure drop across the metering orifices 25, 26 and 30, 31 will, however, tend to move the throttle valve 90 towards the right, i.e. in a direction opposite to that in which it tends to be moved by the acceleration control governor 104. Thus, the axial position of the throttle valve 90 will depend in part upon the pressure drop across the metering orifices 25, 26 and 30, 31 and in part upon engine rotational speed.

The housing 105 carries centrifugal governors which form an all speed governor 110 and which are provided with arms 111 which engage and axially position a sleeve 112. The sleeve 112 engages the sleeve 24 by way of a thrust bearing 113. It will thus be appreciated that the sleeve 24 is positioned axially by the all speed governor 110 which is responsive to engine rotational speed and which, by means described below, is adapted to limit the engine rotational speed to a selected value.

The sleeve 24 is anchored to the casing 10 by slidable splines or other means (not shown) so that it cannot rotate but is axially movable.

The sleeve 24 is provided with a flange 114 which is engaged by a flange 115 on a lever 116 whose pivot is not shown in the drawings. The extent to which the lever 116 may be moved is limited by virtue of one end thereof being disposed between a deceleration stop 120 and an acceleration stop 121, both of which are adjustable in position.

The lever 116 has an arm 122 which co-operates with a spring 124 which urges the lever 116 in the direction of the acceleration stop 121.

The lower end of the spring 124 abuts a temperature compensating device 123 which is mounted at one end of a lever 125 which is urged against a roller fulcrum 143. The lever 125 carries a roller 130 which engages a cam 131 which is rotatable by means of a pilot's control lever 132.

The cam 131 also bears against a roller 133 which is carried by a lever 134 which is urged against a roller fulcrum 144. The end of the lever 134 remote from the roller fulcrum 144 is urged towards the temperature compensating device 123 by a spring 136.

The levers 125, 134 are respectively provided with arms 140, 141 between which is disposed and against which bears a spring 142. The spring 142 ensures that the levers 125, 134 always remain in contact with the roller fulcrums 143, 144.

The temperature compensating device 123 incorporates temperature compensating tubes which, when the fuel temperature changes, cause relative movement between the spring 124 and the lever 125.

It will be appreciated that adjustment of the pilot's throttle lever 132 will adjust the loading on the spring 124 and will therefore adjust the speed at which the all speed governor 110 moves the sleeve 24 in a direction to reduce the size of the annular gap 25. That is to say, the spring 124 tends to move the sleeve 24 in the opposite direction to that in which it is urged by the all speed governor 110, the force of the spring 124 being adjustable not only by the pilot's control lever 132, but also by the temperature compensating device 123.

The provision of the lever 134 and spring 136 reduces the torque required to operate the pilot's control lever 132.

If desired, the sleeve 22 may be mounted in an adjustable sleeve (not shown) disposed to the left of the fixed bush 23 and separated therefrom by an annular gap. This annular gap would then serve a function similar to the gap 31 but the apertures 30 could in this case be triangular in shape like those of the apertures 26.

I claim:

1. A gas turbine engine fuel system comprising a metering orifice, means for varying the size of the metering orifice in accordance with at least one engine variable, means for passing through the metering orifice a portion only of the full flow of fuel which flows through the fuel system, a throttle valve which is arranged downstream of the metering orifice and which controls the flow of fuel therethrough in accordance with the pressure drop across the metering orifice, and means for passing through the throttle valve at least a part of both the said portion of the full flow of fuel and the remaining portion thereof.

2. A fuel system as claimed in claim 1 in which the said portion which passes through the metering orifice is a major portion of the said full flow of fuel.

3. A fuel system as claimed in claim 1 in which an acceleration control governor is provided for positioning the throttle valve axially in dependence upon engine rotational speed, the acceleration control governor progressively opening the throttle valve with increased engine rotational speed.

4. A fuel system as claimed in claim 3 in which there is a second metering orifice whose size varies in accordance with at least one engine variable, the said remaining portion passing through the second metering orifice prior to passing through the throttle valve.

5. A fuel system as claimed in claim 4 in which the said second metering orifice is always at least partially open, whatever the value of the respective engine variable or variables.

6. A fuel system as claimed in claim 4 in which the first-mentioned metering orifice and the said second metering orifice comprise axially spaced apart apertures in a common sleeve.

7. A fuel system as claimed in claim 6 in which there is a fixed bush, the common sleeve being mounted within the fixed bush, and there are pressure responsive means for moving the common sleeve axially within the fixed bush, the pressure responsive means being responsive to a function of a pressure prevailing in compressor means of the engine, the said fixed bush obturating each of the said axially spaced apart apertures in the common sleeve to an extent depending upon the axial position of the common sleeve.

8. A fuel system as claimed in claim 7 in which at least some of the apertures in the common sleeve have an axially varying cross section.

9. A fuel system as claimed in claim 8 in which only those apertures in the common sleeve which are part of the first-mentioned metering orifice have an axially varying cross section.

10. A fuel system as claimed in claim 7 in which means are provided for rotating the common sleeve and there are means connecting the common sleeve to the throttle valve to impart rotation to the latter without imparting axial movement thereto.

11. A fuel system as claimed in claim 7 in which there is an axially movable sleeve which is spaced from said fixed bush by an annular gap whose width depends upon the axial disposition of the said axially movable sleeve, and there is an all speed governor which is responsive to engine rotational speed and which is adapted to limit the latter to a selected value, the all speed governor effecting axial positioning of the axially movable sleeve, and the said common sleeve being mounted within the axially movable sleeve.

12. A fuel system as claimed in claim 11 in which the axially movable sleeve is movable in one direction by the all speed governor, there are resilient means for urging the axially movable sleeve towards the opposite direction, and there are both a manual control and a temperature compensating device which is responsive to fuel temperature for adjusting the force of the resilient means.

13. A fuel system as claimed in claim 11 in which the acceleration control governor and the all speeed governor are constituted by centrifugal governors and there is a common rotatable housing which carries said governors and which is adapted to be driven by the engine.

14. A fuel system as claimed in claim 13 in which means are provided for rotating the said common housing at a greater rotational speed than the said common sleeve.

15. A fuel system as claimed in claim 7 in which the pressure responsive means comprises conduit means opposite ends of which are respectively open to two different pressures prevailing in the compressor means of the engine, the conduit means having two spaced restrictions, a bellows arranged to effect axial positioning of the common sleeve, and a chamber which communicates with the space between the restrictions and within which the bellows is mounted.

16. A fuel system as claimed in claim 15 in which pressure relief means are provided for preventing the pressure at one of the said opposite ends of the conduit means from exceeding a predetermined value.

17. A fuel system as claimed in claim 15 in which at least a portion of the bellows is open to the pressure prevailing at one of the said opposite ends of the conduit means.

References Cited

UNITED STATES PATENTS

| | | | |
|---|---|---|---|
| 3,073,115 | 1/1963 | Cowles et al. | 60—39.28 X |
| 3,123,128 | 3/1964 | Zeisloft | 60—39.28 X |
| 3,313,106 | 4/1967 | Matthews | 60—39.28 |

JULIUS E. WEST, *Primary Examiner.*